March 29, 1966  F. I. BEMISS ETAL  3,242,980
SYSTEM FOR PREPARATION AND SERVING OF FOODS
Filed July 24, 1962
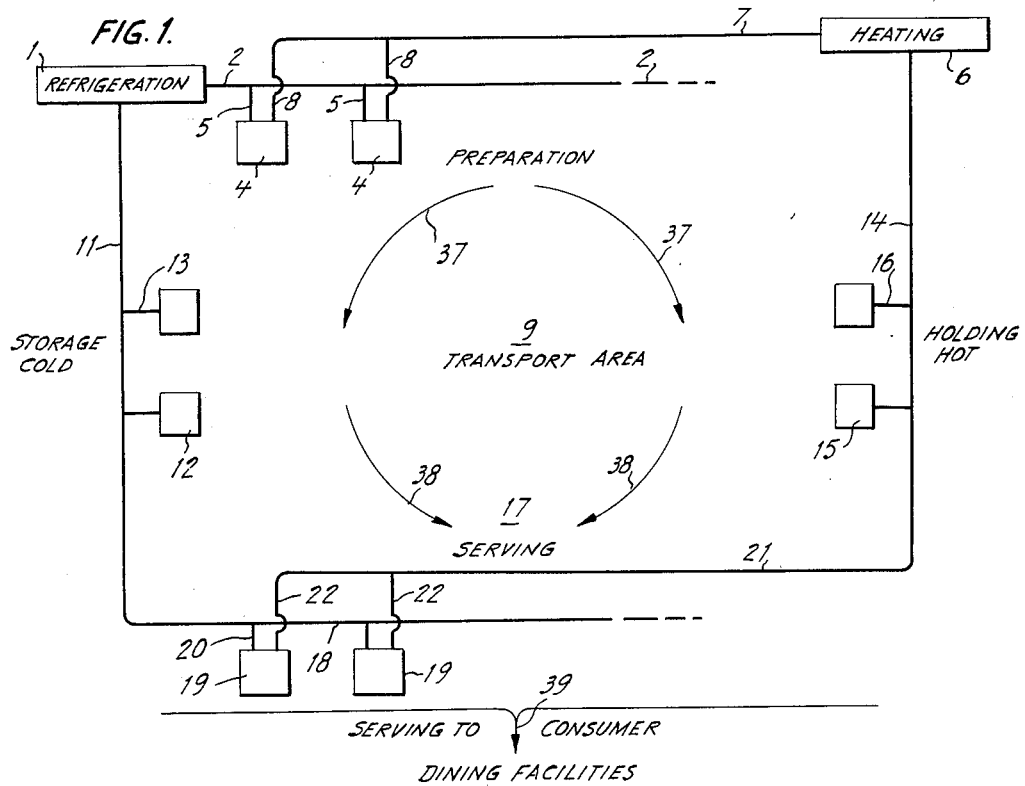
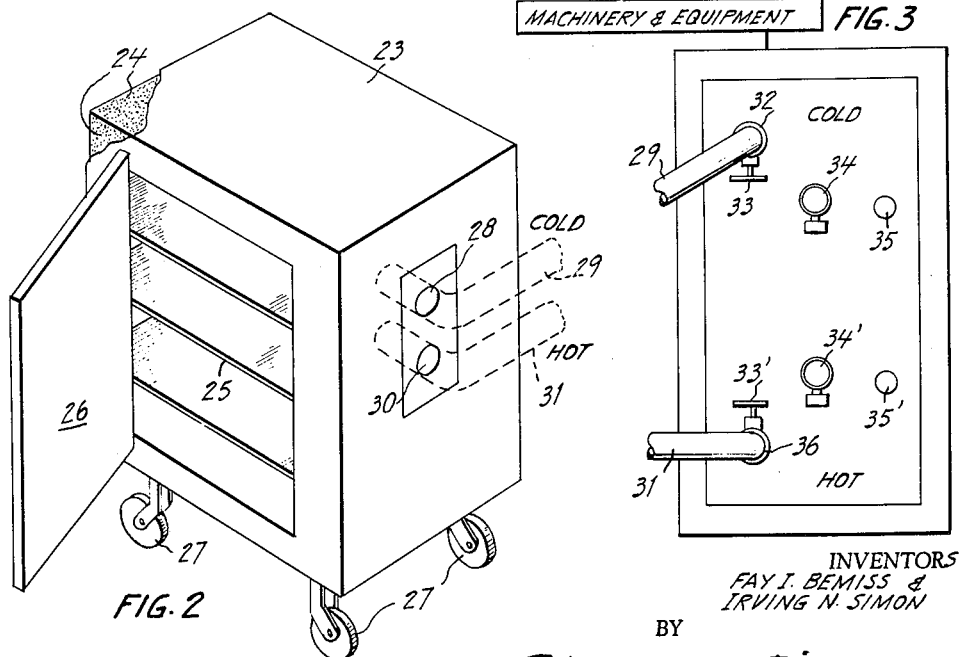
INVENTORS
FAY I. BEMISS &
IRVING N. SIMON
BY
Bierman & Bierman
ATTORNEYS

# United States Patent Office 3,242,980
Patented Mar. 29, 1966

3,242,980
SYSTEM FOR PREPARATION AND SERVING OF FOODS
Fay I. Bemiss, Statler Hilton Hotel, and Irving N. Simon, 401 7th Ave., both of New York, N.Y.
Filed July 24, 1962, Ser. No. 212,002
5 Claims. (Cl. 165—50)

The present invention is directed to preparing and serving of foods, and more particularly to a system of preparation, storage and distribution for consumption, especially for efficient distribution to a relatively large number of diners.

In catering services involving the preparation of large quantities of both hot and cold foods to be served simultaneously to a large number of persons, it is necessary that all the foods be ready for rapid service throughout the meal. This requires a large staff to prepare the food in the kitchen, transport the same to the dining areas for distribution, and serving the individuals with a minimum of delay. It is also important that the hot foods reach the diner as hot as possible, and the cold foods at the proper temperatures. This involves the use of considerable equipment, the coordinated efforts of many persons and an efficient flow of foods between the kitchen and the dining areas.

The present invention is intended and adapted to provide such a system, it being among the objects thereof to utilize a specially designed portable unit which may be interchangeably used for heated, chilled, frozen and humidified foods.

It is also among the objects of the invention to provide a centralized source of heat, humidity and refrigeration cooperating with portable units for catering of foods particularly to the consumer on the premises.

It is further among the objects of the invention to provide a service for the economical and volume handling of foods for the initial preparation thereof, through the storage and holding thereof, and subsequent delivery and distribution of hot, cooled, and refrigerated foods directly to the consumer for consumption.

In practicing the present invention there are provided a plurality of portable hot and cold handling units, which are in the form of insulated cabinets for food, mounted on wheels. The cabinets are constructed to permit circulation of either hot or cold air therethrough. Connections for supplying such air are provided.

There is also provided a refrigeration machine and a source of heated and usually humidified air. A series of stations, to which tubes from said machine and said heated air source are connected, are placed in an area designated as the food preparation area. Return ducts from said stations lead to the sources of hot and cold air to complete the circulation through the portable units. At a distance from the preparation area and adjacent to the dining area where the food is served directly to the diners, is a second series of stations which are connected to the sources of hot and cold air. At an intermediate area are storage stations supplied with cold air and holding stations supplied with hot air.

In use the foods, both hot and cold, are prepared in the kitchen or preparation area and are placed in the food cabinets. They are connected to the respective sources of hot and cold air and brought to or maintained at the desired temperatures. Just prior to serving the food, the cabinets are brought to the dining area where they may be immediately used to serve the diners or they may be maintained for some time at the proper temperature by connecting them to the proper source of hot or cold air. Often it is desirable to remove the cabinets from the preparation area to make way for preparation of additional food, prior to the demand from the dining area. To facilitate this there are provided storage and holding stations intermediate the preparation and serving areas, where the cabinets are connected to their respective sources of hot or cold air, from which they are shifted to the dinning area for dispensing immediately or for holding unitl needed.

The invention is more fully described in connection with the accompanying drawing constituting a part hereof, and in which like reference characters indicate like parts, and wherein:

FIG. 1 is a diagrammatic plan view of a system of preparation, storage and dispensing of foods for on-the-spot consumption in accordance with the present invention;

FIG. 2 is a perspective view of one of the portable units or cabinets constituting an important element of the system, and FIG. 3 is a diagrammatic front elevational view of one of the station panels to which the cabinets may be connected for use.

Referring to FIG. 1, there is provided a refrigeration machine 1 having a line 2, usually along a wall adjacent to the kitchen. Line 2 usually consists of a tube for supplying cold air and a return duct for the spent air. Line 2 extends along preparation area 3 and is connected to a series of stations 4 by connections 5. There is further provided a heater 6 which may contain means for humidifying the heated air. A line 7, similar to line 2, extends into preparation area 3, and is connected to each of stations 4 by connections 8.

Beyond area 3 is an intermediate section 9 for retaining foods at predetermined temperatures temporarily. Line 11 from refrigerator 1, similar to line 2, is connected to auxiliary stations 12 by connections 13. Also in said section, line 14, similar to line 7, connects heater 6 to auxiliary stations 15 by connections 16.

Serving area 17 is supplied with cold air by line 18, leading from refrigerator 1, connected to stations 19 by connections 20. Similarly, area 17 is supplied with heated air from heater 6 by line 21 connected to stations 19 by connections 22.

With reference to FIG. 2, each portable unit or cabinet 23 has heat insulating 24 in all the walls thereof. Shelves 25 within the cabinet hold the food to be dispensed and they are so arranged as to permit free circulation of air within the cabinet. Door 26, of any suitable type is adapted to close the front of the cabinet. The door is also heat insulated. The cabinet is mounted on casters 27 for ready portability. Opening 28 through the side of the cabinet holds line 29 adapted to be connected to stations 4, 12 and 19, line 29 having a return for spent cold air. Opening 30 through the wall of unit 23 and adjacent to opening 28 holds line 31, which is adapted to be connected to stations 4, 15 and 19 and which has a return duct for spent hot air.

Each of the stations, as seen in FIG. 3, has a panel on which is mounted a fitting 32 supplied with cold air. Line 29 is adapted to be plugged into fitting 32. Valve 33 on the panel serves to control the supply of cold air to unit 23. There is usually present an air pressure gage 34 and a pilot light 35 to show whether air is flowing through the unit. On the panel is a fitting 36 supplied with hot air. Line 31 is adapted to be plugged into fitting 36. Valve 33' controls the supply of hot air to unit 23, and pressure gage 34' and pilot light 35' are provided.

In the operation of the system, food prepared in the kitchen is placed in cabinets 23, which are then wheeled out into the preparation area 3, thus freeing the kitchen for further preparation of food. Each cabinet is plugged into a station panel 4 to supply refrigeration or hot air thereto, as the case may be, to keep the food cold or hot. If the food is not to be consumed immediately, the cabinets are wheeled at 37 to transport area 9 where they are connected at stations 12 or 15 to refrigeration or heat sources. Then when time for serving the food approaches, the cabinets are wheeled at 38 into serving area 17 where they are connected to the respective stations 19. At the time of actual serving the food is removed from the cabinets and brought to the dining area as shown at 39.

The above system has great flexibility in that the prepared food is loaded into the portable units in the kitchen and they can then be shunted in a variety of ways into various areas dependings on conditions prevailing at the moment. For instance, if the serving area is crowded, the units may be held either in the preparation area or the holding or storage areas. Also, loaded cabinets may by-pass one or more areas between the kitchen and the dining areas. It eliminates the necessity for duplicating equipment, such as refrigeration or heating apparatus. It improves the control of the temperature of the prepared food in the processing and insures the correct temperature at the time of serving the food.

Various changes in the details of the system may be made. For instance, the tubes and ducts may be of flexible materials, and a line consisting of a tube and a duct may have them alongside each other or they may be concentric. The cabinets may be of any suitable construction and the doors thereof may be of swinging, roll-up, drop, or sliding types. The several elements, such as cabinets, panels, connections etc. may be of various sizes, shapes and types. These and other changes may be made without departing from the principles herein set forth, and the invention is to be broadly construed and not to be limited except by the character of the claims appended hereto.

What is claimed is:

1. A system for conditioning and dispensing foods which comprises a refrigeration unit and a heating unit spaced therefrom, a first station between said units, portable insulated food cabinets at said first station, ducts from said units to said first station and return ducts therefrom, means in said cabinets for connection to said ducts, a second station remote from said first station, other ducts from said refrigeration and heating units to said second station, portable insulated food cabinets at said second station, means in said cabinets for connection to said other ducts, and means for selectively passing heating and cooling air through said ducts and said other ducts.

2. A system according to claim 1 characterized in that a plurality of said first stations are connected to said refrigeration unit.

3. A system according to claim 1 characterized in that a plurality of said first stations are connected to said heating unit.

4. A system according to claim 1 characterized in that said cabinets have means for moving the same from said stations.

5. A system according to claim 1 characterized in that said heating unit has means for humidifying the air.

References Cited by the Examiner

UNITED STATES PATENTS

| | | | |
|---|---|---|---|
| 2,439,487 | 4/1948 | Reilly | 165—42 |
| 2,442,344 | 6/1948 | Curtis | 98—52 |
| 2,609,183 | 9/1952 | Fitzgerald | 165—22 |
| 3,008,401 | 11/1961 | Cittadino | 98—2 |

FOREIGN PATENTS 589,736  12/1959  Canada.

ROBERT A. O'LEARY, *Primary Examiner.*

CHARLES SUKALO, *Examiner.*